United States Patent [19]
Lonning

[11] 3,901,839
[45] Aug. 26, 1975

[54] VINYL HALIDE RESIN COMPOSITIONS HAVING HIGH FLEX ENDURANCE

[75] Inventor: Thor J. G. Lonning, Suffield, Conn.

[73] Assignee: Monsanto Company, St. Louis, Mo.

[22] Filed: July 27, 1972

[21] Appl. No.: 275,503

[52] U.S. Cl....... 260/23.7 N; 260/23 XA; 260/23 S; 260/23 AR; 260/23.7 N; 260/23.7 H; 260/23.7 M; 260/31.8 AN; 260/31.8 B; 260/31.8 M; 260/45.7 P; 260/45.7 S; 260/45.75 V; 260/45.95; 260/876 R; 260/880 R
[51] Int. Cl............................................. C08f 29/24
[58] Field of Search ..... 260/876 R, 31.8 M, 23 XA, 260/23.7 N, 45.7 P, 45.75 V, 45.95

[56] References Cited
UNITED STATES PATENTS

| | | | |
|---|---|---|---|
| 3,288,886 | 11/1966 | Himei et al. | 260/876 R |
| 3,406,136 | 10/1968 | Scarso et al. | 260/876 R |
| 3,557,251 | 1/1971 | Tanaka et al. | 260/876 R |
| 3,673,279 | 6/1972 | Takahashi et al. | 260/876 R |
| 3,682,857 | 8/1972 | Harris et al. | 260/876 R |
| 3,808,293 | 4/1974 | Garrison | 260/45.7 PH |

*Primary Examiner*—Wilbert J. Briggs, Sr.
*Attorney, Agent, or Firm*—Joseph S. Nelson; Edward P. Grattan; James C. Logomasini

[57] ABSTRACT

Polyblends of vinyl halide resin, graft copolymers having a styrene-acrylonitrile superstrate and a butadiene substrate, and a polymethylmethacrylate polymer. Film and sheet material formed from such blends are characteristically semi-rigid and display unusually high flex endurance.

4 Claims, No Drawings ns HAVING
VINYL HALIDE RESIN COMPOSITIONS HAVING HIGH FLEX ENDURANCE

BACKGROUND

Characteristically, vinyl halide resins, when in the form of semi-rigid sheet and film materials, have relatively low flex endurance. For example, a homopolyvinyl chloride based semi-rigid formulation containing 16 to 22 parts per 100 parts resin of a monomeric type plasticizer, filled or unfilled, and formed into a sheet about 15 to 30 mils thick typically displays poor flex fatigue characteristics (e.g. about 3 to 12,000 flex cycles measured on a Ross Flex Tester using ASTM Test Procedure No. D–1052. Vinyl halide resin polyblends having such limited flex endurance have heretofore not generally been suited for utilization in those applications where flex endurance is desirable, such as in shoe counters, plastic one-piece hinges, and the like.

There has now been discovered a new and very useful vinyl halide resin based composition which, when formed into sheet members ranging from, say, about 15 to 30 mils in thickness, displays unusually good flex fatigue characteristics, typically about 40,000 to one million Ross Flex cycles, measured as above indicated, though larger and smaller numbers of Ross Flex cycles may be observed, depending upon the particular type and level of individual components used in any given such composition.

These unusual flex properties are gained without substantially adversely affecting various other physical strength properties, such as tensile strength, impact strength, high speed stitch crack resistance, and the like. Sometimes these associated physical properties are actually apparently improved in the compositions of this invention compared to prior art, such as the homopolyvinyl chloride semi-rigid based formulation above referenced.

SUMMARY

The present invention relates to an improved vinyl halide resin based polyblend of the type containing on a 100 weight per cent total polyblend composition basis:

A. from about 1 to 10 weight per cent of a stabilizer system for said polyblend, said stabilizer system being adapted to substantially prevent thermal degradation in said polyblend at temperatures in the range of from about 120° to 215°C. at inverse times of from about 30 minutes to 10 minutes, B. up to about 50 weight per cent of a plasticizer system, the amount of plasticizer in any given polyblend being sufficient to produce in said polyblend after such is heat fused at a temperature in the range of from about 120° to 215°C., a stiffness in flexure E value in the range of from about 20,000 to 200,000 psi, and C. from about 0.2 to 2.5 weight per cent of a lubricant system adapted to permit release of said polyblend from a heated solid surface after said polyblend has been heat fused at a temperature in the range of from about 120° to 215°C.

The improvement of the present invention concerns the utilization, in such type of polyblend, of a combination of three components, as follows (on a 100 weight per cent three component composition basis):

A. from about 20 to 76 weight per cent of vinyl halide polymer selected from the group consisting of homopolyvinyl chloride and vinyl chloride copolymers comprising at least about 85 weight per cent vinyl chloride monomer with the balance up to 100 weight per cent of any given such copolymer being another ethylenically unsaturated monomer copolymerized with said vinyl chloride monomer, said vinyl halide polymer being itself characterized by having an inherent viscosity of from about 0.70 through 1.5 in a 0.2 weight per cent cyclohexanone solution at about 25 to 30°C., (measured by ASTM Procedure D–1243–66 Method A), B. from about 20 to 55 weight per cent of a graft copolymer comprising:
 1. a substrate comprising on a 100 weight per cent total substrate basis:
  a. at least about 50 weight per cent of a combined conjugated alkadiene containing from 4 through 6 carbon atoms per molecule,
  b. not more than about 50 weight per cent of a combined monovinyl aromatic compound containing from 8 through 10 carbon atoms per molecule, and
  c. not more than about 25 weight per cent of a combined alkene nitrile containing from 3 through 5 carbon atoms per molecule,
 2. said substrate being further characterized by having:
  a. a glass phase transition temperature below about 0°C.,
  b. a Young's Modulus of less than about 40,000 p.s.i., and
  c. a dispersed particle size distribution such that at least about 95 weight per cent thereof is in the form of particles ranging from about 0.7 to 15 microns in diameter,
 3. a superstrate comprising on a 100 weight per cent total superstrate basis:
  a. from about 15 to 50 weight per cent of a combined alkene nitrile containing from 3 through 5 carbon atoms per molecule, and
  b. from about 50 to 85 weight per cent of a combined monovinyl aromatic compound containing from 8 through 10 carbon atoms per molecule,
 4. said superstrate being grafted to said substrate to the extent of about 70 to 150 parts by weight graft per 100 parts by weight of substrate, and C. from about 4 to 25 weight per cent of a polymethylmethacrylate having a weight average molecular weight of at least about 200,000.

VINYL HALIDE POLYMER

Vinyl halide polymers employed as starting materials in this invention (as broadly described above) are well known to the art, and generally any such polymer having properties as above indicated can be used in this invention.

Preferred vinyl chloride copolymers are produced by copolymerizing vinyl chloride monomer with other ethylenically unsaturated aliphatic monomers having molecular weights generally under about 260 and copolymerizable with vinyl chloride to produce polyvinyl chloride include olefins, such as ethylene, propylene, and the like; vinylidene monomers such as vinyl esters of monobasic organic acids containing 1–20 carbon atoms (e.g., vinyl ether, 2-ethyl hexyl vinyl ether, benzyl vinyl ether, etc.) and vinylidene chloride; alkyl acrylate esters in which the alkyl group contains 1–20 carbon atoms (e.g., methyl acrylate, butyl acrylate, octadecyl acrylate, etc.); the corresponding alkyl methacrylate esters, dialkyl esters of dibasic organic acids in which the alkyl groups contain 2–8 carbon atoms (e.g., dibutyl fumarate, diethyl maleate, etc.); and the like.

It is preferred to use vinyl halide polymers as starting materials which are in the form of particles at least 90 weight per cent of which pass through a 40 mesh USBS sieve.

STABILIZERS

Those skilled in the art will readily appreciate that polyblends of this invention can employ any conventional stabilizer system having properties as above indicated. Many different stabilizers and stabilizer combinations are known; see, for example, listing and descriptions given in the 1967 issue of Modern Plastics Encyclopedia, Pages 412–415, 491–493 and 509. One presently preferred stabilizer system consists of a combination tri-basic-lead-sulphate (e.g. Tribase XL (N.L. Industries)) and 4,4'-butylidene-bis-(6-t Butyl-m-cresol) (e.g. Santowhite Powder (Monsanto Co.)).

LUBRICANTS

Those skilled in the art will readily appreciate that polyblends of this invention can employ any conventional lubricant system having properties as above indicated. Many different lubricants and lubricant combinations are known, such as fatty acids, fatty acid salts and esters, paraffinic waxes, and the like. One presently preferred lubricant is a di-basic lead stearate (e.g. D.S. 207 (N.L. Industries)).

PLASTICIZERS

Those skilled in the art will readily appreciate that polyblends of this invention can employ any conventional plasticizer system having properties as above indicated. Many different plasticizers and plasticizer combinations are known; see, for example, listing and descriptions given in the 1967 issue of Modern Plastics Encyclopedia, Pages 418–450. One presently preferred plasticizer is Heptyl Nonyl Adipate (Santicizer 97A (Monsanto Co.)).

ADDITIVES

Optionally, if desired, one may incorporate into polyblends of this invention, in addition to the above components, minor amounts (usually less than about 15 weight per cent (total composition basis) of conventional additives, such as colorants, fillers, processing aids, flame retardants, and the like.

PROCESSING

The vinyl halide polymer and various additives can be preblended before being admixed together into a composition of the invention, or not, as desired. Preblending can be accomplished by simple, conventional physical mixing using, for example, a ribbon blender, or the like.

The blends of this invention can conveniently be made either by intensive mechanical mixing without fusion in powder form, or by mechanical mixing with heat-fusion followed by dicing (or other equivalent procedure of particulation).

When using the latter technique, it is convenient and preferred to prepare a preblend mixture of starting materials by mechanically mixing same, and then to subject such preblend for a short period of time to further mixing at a temperature above the fusion (melting) temperature of the resinous (polymeric) components (starting materials) to homogenize same. This homogenizing procedure may be performed on a 2-roll rubber mill until the polymer fuses and a rolling bank is formed. The roll temperatures are maintained at about 160° to 180°C. throughout the mixing operation. Alternatively, such a preblend may be homogenized and fused in a Banbury Mixer.

When preparing a non-fused powder blend, vinyl chloride polymer and plasticizer composition (plus optional additives) are conveniently mechanically blended in an intensive mixer, such as a Henschel Mixer, or the like.

In general, a compression molded slab of a blend of this invention should, when subsequently statically exposed in an air oven, demonstrate a substantial freedom from discoloration after 10 minutes at 190°C. at atmospheric pressure.

To form a sheet or film from a polyblend such is first heat-fused. Heat fusion may be conventionally accomplished by any convenient means, but preferably one employs temperatures ranging from about 170° to 215°C. The apparatus used, for example, may be:

a. a Banbury Mixer,
b. a two-roll mill,
c. an extruder, especially a screw type,
d. a calender roll series, or the like, as those skilled in the art will appreciate.

Sheets and films are conveniently made from blends of the invention by most preferably calendering same at temperatures generally ranging from about 170°C. to 215°C. depending upon quantity of plastizicer employed in a given blend.

The dispersed particle size distribution of the substrate in the case of the graft copolymer is conveniently measured for purposes of the present invention by the use of either angular dependent light scattering or centrifugal photosedimentometry.

One preferred class of products of the present invention comprises heat-fused polyblends of vinyl halide polymer, graft copolymer and polymethylmethacrylate polymer, all as herein above described, which have been heat-fused and formed into sheet members ranging in thickness from about 10 to 125 mils, with thickness ranges of from about 12 to 50 mils being more preferred.

THE GRAFT COPOLYMER

The graft copolymer has a substrate as defined above. A preferred class of substrates here for use in this invention are diene polymer elastomers. Examples of diene polymer elastomers include, for example, natural rubber having isoprene linkages, polyisoprene, polybutadiene (preferably one produced using a lithium alkyl or Ziegler catalyst), styrene-butadiene copolymer elastomers, butadiene acrylonitrile copolymer elastomer, mixtures thereof, and the like. Such elastomers include homopolymers and interpolymers of conjugated 1,3-dienes with up to an equal amount by weight of one or more copolymerizable monoethylenically unsaturated monomers, such as monovinyl aromatic compounds; acrylonitrile, methacrylonitrile, and the like.

A more preferred group of diene polymer elastomers are those consisting essentially of about 75.0 to 100.0 per cent by weight of butadiene and/or isoprene and up to about 25.0 per cent by weight of a monomer selected from the group consisting of monovinyl aromatic compounds and a nitrile (e.g. acrylonitrile), or mixtures thereof. Particularly advantageous elastomer substrates are butadiene homopolymer or an interpolymer of 90.0 to 95.0 per cent by weight butadiene and 5.0 to 10.0 per cent by weight of acrylonitrile or styrene.

Although the substrate of a graft copolymer employed in this present invention may generally contain up to about 2.0 per cent by weight of a crosslinking agent, based on the weight of the rubberforming monomer or monomers, crosslinking may present problems in dissolving the rubber in monomers for a graft polymerization reaction (as when one makes an interpolymer system as described in more detail hereinafter). In addition, excessive crosslinking can result in loss of the rubbery characteristics. The crosslinking agent can be any of the agents conventionally employed for crosslinking rubbers, e.g. divinyl benzene, diallyl maleate, diallyl fumarate, diallyl adipate, allyl acrylate, allyl methacrylate, diacrylates and dimethacrylates of polyhydric alcohols, e.g. ethylene glycol dimethacrylate, etc.

Preferred substrates for the graft copolymer have a dispersed particle size distribution such that at least about 95 weight per cent thereof is in the form of particles ranging from about 1 to 3 microns in diameter.

The graft copolymer has a superstrate as defined above. A preferred class of superstrates comprises those formed of styrene and acrylonitrile. Preferably the superstrate contains from about 55 to 75 weight per cent thereof being the alkene nitrile compound.

Preferably, a graft copolymer has from about 90 to 120 parts by weight graft per 100 parts by weight substrate.

The graft copolymer is well known to the art, and may be prepared by any conventional means known to those skilled in the art. For example, a graft copolymer is sometimes known as an ABS-type graft copolymer and may be prepared by suspension polymerization techniques.

Those skilled in the art will appreciate that the graft copolymer typically contains (as indicated above in the recitation of superstrate to substrate graft ratios) some ungrafted superstrate material, and that sometimes ungrafted substrate material is also present. While is is preferred for purposes of practicing the present invention to use a graft copolymer, it will be appreciated that one can add minor amounts of ungrafted substrate or of ungrafted superstrate material to a product blend of this invention. Typically, added elastomer (substrate) has a plasticizing effect, while typically added superstrate (copolymer) tends to have an embrittling effect (particularly over minimum added amounts). It is preferred to keep total amounts of added superstrate and-/or substrate materials (or any other added materials) below about 15 weight per cent (based on total product polyblend weight).

In a heat fused polyblend of this invention, such as one which has been formed with a film or sheet member, it is presently theorized (and there is no intent to be bound by a theory in this invention) that ungrafted superstrate material, and even ungrafted substrate material, may, and in some instances, actually does, blend with and fully alloy or mix with the polyvinyl halide polymer, so that, in such a heat fused system, there is a continuous phase of predominately polyvinyl halide polymer within which is dispersed discontinuities (or discontinuous phases) of the graft copolymer.

THE POLYMETHYLMETHACRYLATE POLYMER

The polymethylmethacrylate is well known to those skilled in the art and may be prepared by any conventional means known to those skilled in the art as by emulsion polymerizing methylmethacrylate monomer. A preferred class of such polymers has number average molecular weights ranging from about 750,000 to 2,000,000.

As those skilled in the art well appreciate, polymethylmethacrylate has been heretofore used solely as a processing aid in the manufacture of polyvinylchloride resin based compositions. Thus, polymethylmethacrylate has been known both to reduce nerve and to improve hot tear strength in polyvinyl chloride sheeting (as in a calendering or a vacuum forming application subsequent to sheet or film formation from a compound). So far as is now known, however, polymethylmethacrylate has never heretofore been used to improve the physical properties of a polyvinyl chloride resin formulation in combination with a graft copolymer of the so-called ABS type. Surprisingly, when a polymethylmethacrylate resin is compounded with such a graft copolymer in accordance with the teachings of the present invention there results a vinyl halide resin polyblend product which, when heat fused and formed into a sheet or film member conventionally as taught herein, results in a product member having an unexpected rise in flex endurance compared to prior art vinyl chloride resin polyblends containing either the polymethylmethacrylate or the graft copolymer alone.

For purposes of the present invention, it is generally preferred to employ in polyblends of this invention utilizing a higher molecular weight vinyl halide polymer a lower quantity of the graft copolymer than when one is using a lower (or medium) molecular weight vinyl halide polymer. In this connection, the term "higher" as used herein in reference to the molecular weight of a vinyl halide polymer indicates such a polymer which has an inherent viscosity greater than about 1.1 in a 0.2 weight per cent cyclohexanone solution at about 25° to 30° C; "lower" and "medium" molecular weight vinyl halide polymers fall below such inherent viscosities. Thus, for an example, in a polyblend utilizing such a high molecular weight vinyl halide polymer (not including stablizer(s), plasticizer(s), or lubricant(s), a typical preferred composition is as follows:

| material | wt% (100% basis) |
|---|---|
| higher molecular weight polyvinyl chloride resin | 64 |
| graft copolymer | 30 |
| polymethylmethacrylate | 6 |

Similarly, for another example, in a polyblend utilizing a lower (or medium) molecular weight vinyl halide polymer (not including stabilizer(s), plasticizer(s), or lubricant(s), a typical preferred composition is as follows:

| material | wt% (100% basis) |
|---|---|
| lower (or medium) molecular weight polyvinyl chloride resin | 38 |

-Continued

| material | wt% (100% basis) |
|---|---|
| graft copolymer | 50 |
| polymethylmethacrylate | 12 |

Composition of a polyblend of this invention is expressed in percentage of the polymer constituents unless otherwise indicated. Additives, stabilizers, plasticizers, lubricants, and the like are expressed in parts per hundred parts of the polyblended polymer composition unless otherwise indicated.

EMBODIMENTS

The following additional examples are set forth to illustrate more clearly the principles and practices of this invention to one skilled in the art, and they are not intended to be restrictive but merely to be illustrative of the invention herein contained. Unless otherwise stated herein, all parts and percentages are on a weight basis.

EXAMPLES A – E

The following vinylchloride polymers as shown in Table I are used in the preparation of polyblends of this invention.

EXAMPLES F – H

The following graft copolymers as shown in Table II are used in the preparation of polyblends of this invention. Substrates of these graft copolymers each have glass phase transition temperatures below about 0° C.; a Youngs modulus of less than about 40,000 psi. If desired, the substrate may contain styrene and/or acrylonitrile.

EXAMPLES I – K

The following polymethylmethacrylate polymers as shown in Table III are used in the preparation of polyblends of this invention.

TABLE III

| Ex. Des. | Polymer | Wt. Average mol. wt. | Average Particle Size (microns) | Viscosity[1] centipoises (Brookfield) |
|---|---|---|---|---|
| I[2] | Polymethylmethacrylate | about 1,000,000 | about 40 | 400–700[5] |
| J[3] | Polymethylmethacrylate | about 1,250,000 | about 40 | 1200–1700[6] |
| K[4] | Polymethylmethacrylate | about 1,000,000 | about 40 | 400–700 |

TABLE III FOOTNOTES
[1]Measured as a 10 weight per cent solution of polymer in toluene (average).
[2]Polymer available commercially from Rohm and Haas Company, Philadelphia, Pa., under the trade designation Acryloid K-120-N. (A similar suitable material from the same Company available under the designation Acryloid K-120-ND).
[3]Polymer available commercially from the Rohm and Haas Company under the trade designation Acryloid 6523XP.
[4]Polymer available commercially from Ionac Chemical Division of Sybron Corporation, Birmington, New Jersey, under the trade designation Ionac PA-910.
[5]Available commercially in range from about 200–1000.
[6]Available commercially in range from about 1000 to 2000.

EXAMPLES L – O

The following stabilizer systems as shown in Table IV are used in the preparation of polyblends of this invention.

EXAMPLES P – R

The following plasticizers as shown in Table V are used in the preparation of polyblends of this invention.

TABLE I

VINYL CHLORIDE POLYMERS

| Ex. Des. | Polymer | Specific Viscosity[1] | Inherent Viscosity[2] | ASTM Classification[3] | Inherent Viscosity[7] | Polymerization Degree |
|---|---|---|---|---|---|---|
| A | Homopolyvinyl chloride[4] | 0.39 | 0.82 | C-P-3-16363 | | |
| B | Homopolyvinyl chloride[5] | 0.48 | 0.98 | C-P-5-15453 | | |
| C | Homopolyvinyl chloride[6] | 0.55 | 1.11 | C-P-6-15453 | | |
| D | Copolymer of 97 wt. % vinyl chloride and 3 wt. % vinyl acetate[8] | | | | 1.07 | |
| E | Homopolyvinyl chloride[9] | 0.69/0.70 | 1.34 to 1.37 | | | 2300 |

TABLE I FOOTNOTES
[1]Specific viscosity measured using a solution of 0.42 gm. polymer in 100 ml. cyclohexanone at 25° C.
[2]Inherent viscosity measured using a solution of 0.2 wt. per cent polymer in cyclohexanone at 30° C.
[3]ASTM classification according to ASTM test procedure D-1755-60T
[4]Polymer available commercially from Monsanto Company, St. Louis, Mo., under that Company's trademark "Opalon 630".
[5]Polymer available commercially from Monsanto Company, St. Louis, Mo., under that Company's trademark "Opalon 650".
[6]Polymer available commercially from Monsanto Company, St. Louis, Mo., under that Company's trademark "Opalon 660".
[7]Inherent viscosity measured using a solution of 0.2 wt. per cent polymer in cyclohexanone at 25°C.
[8]Polymer available commercially from Union Carbide Plastics Co. under the trade designation VYNW.
[9]Polymer available commercially from Monsanto Mitsubishi Kasei under the trade designation resin Sunprene KR-800.

TABLE II

GRAFT POLYMERS

| Ex. Des. | Substrate | Superstrate | Average Particle Size (microns) | Parts superstrate per 100 parts Substrate |
|---|---|---|---|---|
| F[1] | Homopolybutadiene | 71–73 wt. % styrene and 27–29 wt. % acrylonitrile | 1.5 – 1.8 | 95– 115 |
| G[1] | Homopolybutadiene | 71–73 wt. % styrene and 27–29 wt. % acrylonitrile | 1.1 – 1.2 | 90 – 100 |
| H[1] | Homopolybutadiene | 71–73 wt. % styrene and 27–29 wt. % acrylonitrile | 0.9 – 1.0 | 90 – 100 |

TABLE II FOOTNOTE
[1]Graft copolymers produced by suspension polymerization.

EXAMPLES S AND T

The following lubricants as shown in Table VI are used in the preparation of polyblends of this invention.

TABLE IV

STABILIZER SYSTEMS

| Ex. Des. | Composition | Type | Physical Form |
|---|---|---|---|
| L | Tribasic lead sulfate[1] | Heat Stabilizer | Solid |
| M | Barium/Cadmium fatty acid salt[2] | Heat Stabilizer | Solid |
| N | Alkyl Aryl Phosphate[3] | Chelator | Liquid |
| O | 4,4'-Butylidene-bis-(6-t-butyl-m-cresol)[4] | Antioxidant | Solid |

TABLE IV FOOTNOTES
[1] Available commercially as "Tribase XL" (TM) from NL Industries
[2] Available commercially as "Mark 1260" (TM) from Argus Chem Corp. Subsidiary of Witco Chemical Co.
[3] Available commercially as "Mark C" (TM) from Argus Chem Corp. Subsidiary of Witco Chemical Co.
[4] Available commercially as "Santowhite powder" (TM) from Monsanto Company

TABLE V

PLASTICIZERS

| Ex. Des. | Composition | Physical Form |
|---|---|---|
| P | Heptyl nonyl adipate[1] | Liquid |
| Q | Heptyl nonyl tri mellitate[2] | Liquid |
| R | Di(isodecyl)phthalate[3] | Liquid |

TABLE V FOOTNOTES
[1] Available commercially as "Santicizer 97A" (TM)
[2] Available commercially as "Santicizer 79 TM" (TM)
[3] Available commercially as DIDP from Monsanto Company

TABLE VI

LUBRICANTS

| Ex. Des. | Composition | Physical Form |
|---|---|---|
| S | Dibasic lead stearate[1] | Solid |
| T | Stearic acid[2] | Solid |

[1] Available commercially as "DS-207" from NL Industries
[2] Available commercially from Witco Chemical Company

EXAMPLES 1 – 23

The above components of each of Examples A through T, respectively, are utilized in the preparation of a series of polyblends of this invention. Each polyblend is then formed into a sheet member and tested for stiffness and flex fatigue.

The procedure involves mixing together the respective components of each polyblend together in blending operation until substantial uniformity of intermixing occurs. Then each blend is Banburied, mill rolled, and calendered at 170° to 180° C. to make a sheet of from 15 to 30 mils thick.

The sheets prepared from each polyblend are tested for (A) Tinius Olsen stiffness using ASTM test D-747-61T (measured in stiffness of flexure, E, in pounds per square inch, and (B) Ross Fatigue Flexing using ASTM-test D-1052 (in total number of cycles to break).

TABLE VII

| Component or Property | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| A | 64 | | | | | | | | | | | | | | | | | | | | |
| B | | 64 | | | 64 | 64 | 64 | 64 | 64 | 54 | 44 | 38 | 48 | 48 | 48 | 48 | | | | | |
| C | | | 64 | | | | | | | | | | | | | | | | | | |
| D | | | | 64 | | | | | | | | | | | | | | | | | |
| E | | | | | | | | | | | | | | | | | 64 | 54 | 44 | 48 | 48 |
| F | 30 | 30 | 30 | 30 | | 30 | 30 | 30 | 40 | 50 | 50 | 40 | 40 | 40 | 40 | 30 | 40 | 50 | 40 | 40 | |
| G | | | | | 30 | | | | | | | | | | | | | | | | |
| H | | | | | | 30 | | | | | | | | | | | | | | | |
| I | 6 | 6 | 6 | 6 | 6 | 6 | 6 | | 6 | 6 | 12 | 12 | | 12 | 12 | 6 | 6 | 6 | 12 | | |
| J | | | | | | | | 6 | | | | | 12 | | | | | | | | 12 |
| K | | | | | | | | | 6 | | | | | | | | | | | | |
| L | 5 | 5 | 5 | 5 | 5 | 5 | | 5 | 5 | 5 | 5 | 5 | 5 | 5 | 5 | 5 | 5 | 5 | 5 | 5 | 5 |
| M | | | | | | | 3 | | | | | | | | | | | | | | |
| N | | | | | | | .5 | | | | | | | | | | | | | | |
| O | .75 | .75 | .75 | .75 | .75 | .75 | .75 | .75 | .75 | .75 | .75 | .75 | .75 | .75 | .75 | .75 | .75 | .75 | .75 | .75 | .75 |
| P | 16 | 16 | 16 | 16 | 16 | 16 | 16 | 16 | 16 | 15.5 | 15 | 15.5 | 16 | 16 | | | 17 | 16.5 | 16 | 17 | 17 |
| Q | | | | | | | | | | | | | | | 21 | | | | | | |
| R | | | | | | | | | | | | | | | | 20.5 | | | | | |
| S | .75 | .75 | .75 | .75 | .75 | .75 | | .75 | .75 | .75 | .75 | .75 | .75 | .75 | .75 | .75 | .75 | .75 | .75 | .75 | .75 |
| T | | | | | | | .75 | | | | | | | | | | | | | | |
| Tinius Olsen Stiffness (ASTM-D-747-61T) - Stiffness in Flexure, E, PSI × 10³ | 86 | 89 | 90 | 88 | 84 | 82 | 88 | 93 | 90 | 81 | 80 | 84 | 88 | 89 | 103 | 89 | 97 | 84 | 86 | 82 | 82 |
| Ross Fatigue Flexing (ASTM-D-1052) Avg. Cycles to break × 10³ | 62 | 70 | 71 | 72 | 66 | 63 | 64 | 55 | 68 | 57 | 71 | 104 | 68 | 77 | 92 | 84 | 225 | 160 | 120 | 173 | 201 |

What is claimed is:

1. In an improved semi-rigid vinyl halide resin based polyblend comprising on a 100 weight percent total polyblend composition basis a. from about 1 to 10 weight percent of a stabilizer system for said polyblend, said stabilizer system being adapted to substantially prevent thermal degradation in said polyblend at temperatures in the range of from about 120° to 215°C., at inverse times of from about 30 minutes to 10 minutes, b. up to about 50 weight percent of a plasticizer system, the amount of plasticizer in any given polyblend being sufficient to produce in said polyblend after such is heat fused at a temperature in the range of from about 120° to 215°C., a stiffness in flexure E value in the range of from about 20,000 to 200,000 psi, and c. from about 0.2 to 2.5 weight percent of a lubricant system adapted to permit release of said polyblend from a heated solid surface after said polyblend has been heat fused at a temperature in the range of from about 120° to 215°C., in combination on a 100 weight percent basis:

A. from about 20 to 76 weight percent of vinyl halide polymer selected from the group consisting of homopolyvinyl chloride and vinyl chloride copolymers comprising at least about 85 weight percent vinyl chloride monomer with the balance up to 100 weight percent of any given such copolymer being another ethylenically unsaturated monomer copolymerized with said vinyl chloride monomer, said vinyl halide polymer being itself characterized by having an inherent viscosity of from about 0.70 through 1.5 in a 0.2 weight percent cyclohexanone solution at about 25° to 30°C., B. from about 20 to 55 weight percent of a graft copolymer comprising:
  1. a substrate comprising on a 100 weight percent total substrate basis:
    a. at least about 50 weight percent of a combined conjugated alkadiene containing from 4 through 6 carbon atoms per molecule
    b. not more than about 50 weight percent of a combined monovinyl aromatic compound containing from 8 through 10 carbon atoms per molecule, and
    c. not more than about 25 weight percent of a combined alkene nitrile containing from 3 through 5 carbon atoms per molecule,
  2. said substrate being further characterized by having
    a. a glass phase transition temperature below about 0° C., and
    b. A Young's Modulus of less than about 40,000 p.s.i.,
  3. a superstrate comprising on a 100 weight percent total superstrate basis:
    a. from about 15 to 50 weight percent of a combined alkene nitrile containing from 3 through 5 carbon atoms per molecule, and
    b. from about 50 to 85 weight percent of a combined monovinyl aromatic compound containing from 8 through 10 carbon atoms per molecule,
  4. said superstrate being grafted to said substrate, and C. from about 4 to 25 weight percent of a polymethylmethacrylate having a weight average molecular weight of at least about 200,000, the improvement which comprises, said vinyl halide based polyblend wherein: said substrate is further characterized by having a dispersed particle size distribution such that at least about 95 weight percent thereof is in the form of particles ranging from about 0.7 to 15 microns in diameter and said superstrate being grafted to said substrate to the extent of about 70 to 150 parts by weight per 100 parts by weight of substrate.

2. An improved semi-rigid vinyl halide resin based polyblend of claim 1 comprising:

A. from about 20 to 76 weight percent homopolyvinyl chloride, said homopolyvinyl chloride polymer being itself characterized by having an inherent viscosity of from about 0.70 through 1.5 in a 0.2 weight percent cyclohexanone solution at about 25° to 30°C.

B. from about 20 to 55 weight percent of a graft copolymer comprising:
  1. a substrate comprised of homopolybutadiene,
  2. said substrate being further characterized by having
    a. a glass phase transition temperature below about 0°C.,
    b. a Young's Modulus of less than about 40,000 p.s.i., and
  3. a superstate comprising on a 100 weight percent total superstrate basis:
    a. from about 25 to 45 weight percent of combined acrylonitrile, and
    b. from about 55 to 75 weight percent of combined styrene,
  4. said superstrate being grafted to said substrate and C. from about 4 to 25 weight percent of a polymethylmethacrylate having a weight average molecular weight of from about 750,000 to 2,000,000.

the improvement which comprises, said vinyl halide based polyblend wherein said substrate is further characterized by having a dispersed rubber particle size distribution such that at least about 95 weight percent thereof is in the form of particles ranging from about 1 to 3 microns in diameter and said superstrate being grafted to said substrate to the extent of about 90 to 120 parts by weight graft per 100 parts by weight of substrate.

3. A heat fused polyblend of claim 1 formed into a sheet member of from about 10 to 125 mils in thickness, having a flex endurance of at least about 40,000 Ross Flex cycles.

4. A heat fused polyblend of claim 2 formed into a sheet member of from about 12 to 50 mils in thickness, having a flex endurance of at least about 40,000 Ross Flex cycles.

* * * * *